(12) United States Patent
Floquet et al.

(10) Patent No.: US 11,498,525 B2
(45) Date of Patent: Nov. 15, 2022

(54) GEAR MOTOR, ASSOCIATED WIPER SYSTEM AND ASSOCIATED CONTROL METHOD

(71) Applicant: Valeo Systèmes d'Essuyage, Le Mesnil Saint Denis (FR)

(72) Inventors: Frédéric Floquet, Le Mesnil Saint Denis (FR); Jose-Luis Herrada, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 672 days.

(21) Appl. No.: 16/334,973

(22) PCT Filed: Jul. 26, 2017

(86) PCT No.: PCT/EP2017/068822
§ 371 (c)(1),
(2) Date: Mar. 20, 2019

(87) PCT Pub. No.: WO2018/054581
PCT Pub. Date: Mar. 29, 2018

(65) Prior Publication Data
US 2019/0263360 A1    Aug. 29, 2019

(30) Foreign Application Priority Data

Sep. 22, 2016 (FR) ........................................ 1658926

(51) Int. Cl.
*B60S 1/16* (2006.01)
*H02K 7/116* (2006.01)
*H02P 6/16* (2016.01)

(52) U.S. Cl.
CPC ............ *B60S 1/166* (2013.01); *H02K 7/1166* (2013.01); *H02P 6/16* (2013.01)

(58) Field of Classification Search
CPC ... B60S 1/166; B60S 1/08; B60S 1/26; H02K 7/1166; H02K 11/215; H02P 6/16;
(Continued)

(56) References Cited

U.S. PATENT DOCUMENTS

2004/0108789 A1* 6/2004 Marshall ................. H02K 1/24
310/216.016
2011/0040519 A1   2/2011 Yeh .......................... H02P 6/18
702/145
(Continued)

FOREIGN PATENT DOCUMENTS

EP          2840700 A1    2/2015
JP        H01-255493 A   10/1989
(Continued)

OTHER PUBLICATIONS

Notification of Reasons for Refusal issued in Japanese Application No. 2019-515581 dated Jul. 28, 2020 (13 pages).
(Continued)

*Primary Examiner* — Katina N. Henson
(74) *Attorney, Agent, or Firm* — Osha Bergman Watanabe & Burton LLP (57) ABSTRACT

The present invention relates to a gear motor (101), in particular for a wiper system, comprising: -a brushless DC electric motor (103) including: -a rotor; -a stator having coils for electromagnetically exciting the rotor; -a device for determining the angular position of the rotor; -a control unit configured to generate control signals for supplying power to the electromagnetic excitation coils of the stator; -a reduction mechanism (104) that is linked on one side to the rotor of the electric motor (103) and on the other side to an output shaft (109), the reduction mechanism (104) having a predefined reduction ratio and; -an output angular position sensor (110) that is configured to measure the angular position of the output shaft (109), wherein the output angular position sensor (110) that is configured to transmit a signal corresponding to the measured angular position of the output shaft (109) to the device for determining the angular position of the rotor and said device is configured to determine the position of the rotor on the basis of the transmitted signal by
(Continued)

taking into account the predefined reduction ratio of the reduction mechanism (104). The invention also relates to a wiper system and to a method for controlling the electric motor (103).

12 Claims, 7 Drawing Sheets

(58) Field of Classification Search
CPC .... H02P 6/145; H02P 6/08; H02P 6/22; H02P 6/153; H02P 23/009
USPC ........... 15/250.12; 318/400.14; 702/145, 151
See application file for complete search history.

(56) References Cited

U.S. PATENT DOCUMENTS

| | | |
|---|---|---|
| 2014/0097777 A1 | 4/2014 | Leong et al. |
| 2014/0271237 A1 | 9/2014 | Kozaki |
| 2015/0082575 A1* | 3/2015 | Kimura ............... H02P 6/08 |
| | | 15/250.12 |

FOREIGN PATENT DOCUMENTS

| | | |
|---|---|---|
| JP | 2006-050721 A | 2/2006 |
| JP | 2007-143213 A | 6/2007 |
| JP | 2011-007658 A | 1/2011 |
| JP | 2014-180081 A | 9/2014 |
| JP | 2014-207779 A | 10/2014 |
| WO | 2013/157558 A1 | 10/2013 |

OTHER PUBLICATIONS

International Search Report and Written Opinion Issued in Corresponding PCT Application No. PCT/EP2017/068822, dated Oct. 27, 2017 (15 Pages with English Translation of International Search Report).

Kim, H. et al: "Using Low Resolution Position Sensors in Bumpless Position/Speed Estimation Methods for Low Cost PMSM Drives", Fourtieth IAS Annual Meeting, IEEE, Oct. 2-6, 2005, XP10842762A, ISBN: 0-7803-9208-6 (8 pages).

* cited by examiner

GEAR MOTOR, ASSOCIATED WIPER SYSTEM AND ASSOCIATED CONTROL METHOD

The present invention relates to a gear motor and in particular a gear motor for motor vehicle wiper systems.

Gear motors are essentially composed of an electric motor coupled to a speed-reducing mechanism responsible for gearing down the speed thereof to obtain a high rotation transmission torque.

Different types of electric motors can be used in a gear motor and in particular the brushless direct current electric motors which offer numerous advantages such as a long life span, a small bulk and low consumption as well as a low noise level.

However, controlling the electric motors is more complex compared to the electric motors with brushes because, to allow for good operation, it is necessary to accurately know the angular position of the rotor of the brushless direct current electric motor.

In effect, such electric motors comprise electromagnetic excitation coils arranged on the stator and powered by alternating current via an inverter to allow permanent magnets arranged on the rotor to be driven.

Now, in order to be able to switch over the switches of the inverter and therefore power the electromagnetic coils at optimal instants to make it possible to obtain the desired driving of the rotor, the position of the rotor needs to be known at least by segments with a few precise points upon the switchover of state. (Generally, for a trapezoidal excitation, six switches on each revolution of the rotor).

Figure 1A:
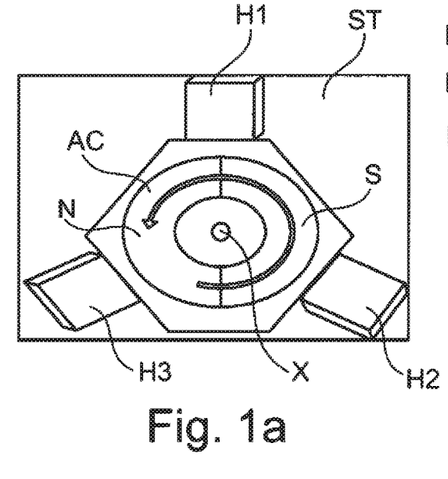
FIG. 1a represents a diagram of an angular detection device for the rotor of an electric motor comprising three Hall effect sensors according to the state of the art.

FIG. 1a shows a diagram of an angular detection device for the rotor of an electric motor comprising three Hall effect sensors according to the state of the art. As can be seen in this figure, three Hall effect sensors denoted H1, H2 and H3 are arranged on the stator ST around a control magnet AC, for example an annular magnet, secured to the rotor of the direct current electric motor of which only the axis X is visible in FIG. 1a. The control magnet AC comprises two poles denoted S for the South Pole and N for the North Pole.

The three Hall effect sensors H1, H2 and H3 are distributed angularly at 120° relative to one another so as to obtain the six instants of switchover of the electromagnetic excitation coils of the stator per cycle corresponding to a rotation angle of 60° of the rotor.

Figure 1B:
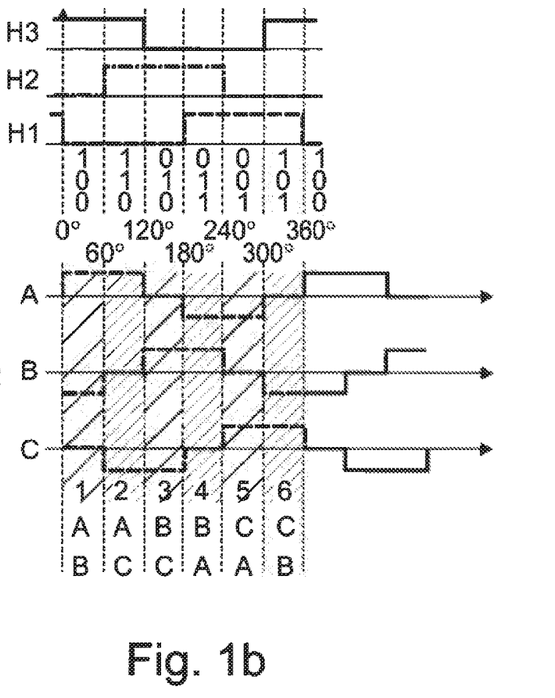
FIG. 1b represents a chart of the signals supplied by the sensors of FIG. 1a and of the control signals of the electromagnetic excitation coils of the electric motor.

FIG. 1b represents, in its top part, the signals from the three Hall effect sensors H1, H2 and H3 and, in its bottom part the signals powering the electromagnetic excitation coils during a 360° cycle of the rotor The cycle is divided into six steps of 60° delimited by vertical dotted lines.

In a first step denoted 1 ranging from 0 to 60 corresponding to a high signal from the sensor H3 and to a low signal from the sensors H1 and H2, the current switches from the phase A to the phase B (the signal corresponding to the phase A is at 1, the signal corresponding to the phase B is at −1and the signal corresponding to the phase C is at 0).

In a second step denoted 2 ranging from 60 to 120° corresponding to a high signal from the sensors H2 and H3 and to a low signal from the sensor H1, the current switches from the phase A to the phase C (the signal corresponding to the phase A is at 1, the signal corresponding to the phase B is at 0 and the signal corresponding to the phase C is at −1).

In a third step denoted 3 ranging from 120 to 180° corresponding to a high signal from the sensor H2 and to a low signal from the sensors H1 and H3, the current switches from the phase B to the phase C (the signal corresponding to the phase B is at 1, the signal corresponding to the phase A is at 0 and the signal corresponding to the phase C is at −1)

In a fourth step denoted 4 ranging from 180 to 240° corresponding to a high signal from the sensors H1 and H2 and to a low signal from the sensor H3 the current switches from the phase B to the phase A (the signal corresponding to the phase B is at 1, the signal corresponding to the phase C is at 0 and the signal corresponding to the phase A is at −1).

In a fifth step denoted 5 ranging from 240 to 300° corresponding to a high signal from the sensor H1 and to a low signal from the sensors H2 and H3, the current switches from the phase C to the phase A (the signal corresponding to the phase C is at 1, the signal corresponding to the phase B is at 0 and the signal corresponding to the phase A is at −1).

In a sixth step denoted 6 ranging from 300 to 360° corresponding to a high signal from the sensors H1 and H3 and to a low signal from the sensor H2, the current switches from the phase C to the phase B (the signal corresponding to the phase C is at 1, the signal corresponding to the phase A is at 0 and the signal corresponding to the phase B is at −1).

Thus, the use of three Hall effect sensors H1, H2 and H3 makes it possible to accurately determine the six positions of the rotor corresponding to the six instants of change of switching of the electromagnetic excitation coils.

However, such a solution is costly because of the high number of Hall effect sensors needed.

Moreover, it is also known practice to use a method without sensors based on the measurement of the back-electromotive forces of the excitation coils of the stator.

However, such a solution requires a startup of the brushless direct current electric motor in synchronous mode until the rotation speed of the rotor and therefore the back-electromotive forces are sufficient to be measured and to be able to be used to control the switching instants.

Now, such a startup in synchronous mode is possible only for applications in which the load is low on startup and relatively known (for example for the control of a fan). It is therefore understood that this solution is not applicable to a gear motor for a motor vehicle wiper system which requires a high load and force torque upon startup and which can be started with almost zero loads (as in the case of wet windows) or with high loads (as in the case of brushes stuck because of ice or snow).

The present invention therefore aims to provide a solution to allow an effective control of a gear motor for a wiper system whose cost is lower than the solution of the state of the art comprising three Hall effect sensors.

To this end, the present invention relates to a gear motor, in particular for a wiper system, comprising:
  a brushless direct current electric motor comprising:
  a rotor,
  a stator having electromagnetic excitation coils for the rotor,
  a device for determining the angular position of the rotor relative to the stator,
  a control unit configured to generate control signals for powering the electromagnetic excitation coils of the stator as a function of the angular position of the rotor determined by the device for determining the angular position of the rotor,
  a speed-reducing mechanism linked on one side to the rotor of the electric motor and on the other side to an output shaft intended to be linked to an external mechanism, in particular a wiper system, the speed-reducing mechanism having a predefined reduction ratio and, an output angular position sensor configured to measure the angular position of the output shaft, wherein the output angular position sensor configured to measure the angular position of the output shaft is connected to the device for determining the angular position of the rotor and is configured to transmit a signal corresponding to the measured angular position of the output shaft and wherein said device for determining the angular position of the rotor is configured to determine the position of the rotor relative to the stator on the basis of the transmitted signal by taking into account the predefined reduction ratio of the speed-reducing mechanism.

The use of an output angular position sensor configured to measure the angular position of the output shaft of the gear motor to determine the position of the rotor makes it possible to control a brushless direct current electric motor even for strong loads on startup as is the case for a gear motor of a wiper device.

According to one aspect of the present invention, the device for determining the angular position of the rotor is configured to
  determine the angular position of the rotor on the basis of a signal from the output angular position sensor for rotation speeds of the rotor below a predetermined threshold, and
  determine the angular position of the rotor on the basis of the back-electromotive force signals from the electromagnetic excitation coils of the stator for rotation speeds of the rotor equal to or above the predetermined threshold.

According to another aspect of the present invention, the back-electromotive force of the, at least one, non-powered electromagnetic excitation coil is measured and transmitted to the device for determining the angular position of the rotor, said device for determining the angular position of the rotor being configured to compare the value of the back-electromotive force to a predetermined threshold associated with a predetermined position of the rotor.

According to an additional aspect of the present invention, the device for determining the angular position of the rotor is configured to correct the angular measurement from the output angular position sensor on the basis of the signals measuring the back-electromotive forces of the electromagnetic excitation coils of the stator.

The use of the back-electromotive forces to correct the angular measurement from the angular position sensor makes it possible to improve the accuracy of the angular measurement of the rotor without requiring any additional sensor.

According to a supplementary aspect of the present invention, the brushless direct current electric motor comprises a single Hall effect sensor associated with a control magnet secured in rotation to the rotor, said Hall effect sensor being connected to the device for determining the angular position of the rotor and wherein said device for determining the angular position of the rotor is configured to correct the angular measurement from the output angular position sensor on the basis of the signal from the Hall effect sensor.

The use of a Hall effect sensor makes it possible to improve the accuracy of the angular measurement of the rotor by correcting the measurement from the output angular position sensor.

According to another aspect of the present invention, the device for determining the angular position of the rotor is configured to detect a change of state of the signal from the Hall effect sensor, said change of state being associated with a predetermined position of the rotor and to correct the measurement from the output angular position sensor on the basis of said detection of the change of state.

According to an additional aspect of the present invention:
  the rotor comprises a predetermined number of magnetic poles,
  the control magnet comprises a number of magnetic poles equal to or greater than the number of magnetic poles of the rotor and,
  the magnetic poles of the control magnet are in phase with the magnetic poles of the rotor such that the sending of a control signal powering the electromagnetic excitation coils of the stator is synchronized with the detection of a change of state of the signal from the Hall effect sensor.

The use of a Hall effect sensor associated with a control magnet whose poles are in phase with magnetic poles of the rotor makes it possible to reliably determine the instants of control of the switchings of the electromagnetic excitation coils that make it possible to drive the rotor.

According to a supplementary aspect of the present invention, the electric motor comprises two Hall effect sensors associated with a control magnet secured in rotation to the rotor, said Hall effect sensors being angularly offset relative to one another and connected to the device for determining the angular position of the rotor and wherein said device for determining the angular position of the rotor is configured to correct; the angular measurement signal from the output angular position sensor on the basis of the signals from the two Hall effect sensors.

The use of two Hall effect sensors makes it possible to further improve the accuracy of the angular measurement of the rotor and/or to reduce the accuracy required of the output angular position sensor to allow for a reliable control of the switchings of the electromagnetic excitation coils.

According to an additional aspect of the present invention, the device for determining the angular position of the rotor is configured to:
  determine the angular position of the rotor on the basis of the signals from, on the one hand, the Hall effect sensor or sensors and, on the other hand, the output angular position sensor for rotation speeds of the rotor below a predetermined threshold, and
  determine the angular position of the rotor on the basis of the back-electromotive force signals from the electromagnetic excitation coils of the stator for rotation speeds of the rotor equal to or above the predetermined threshold,
  and wherein the device for determining the angular position of the rotor is configured to correct the angular measurement from the Hall effect sensor or sensors and/or from the output angular position sensor on the basis of the signals measuring the back-electromotive forces of the electromagnetic excitation coils of the stator.

The use of the back-electromotive forces to correct the angular measurement from the Hall effect sensor or sensors and/or from the angular position sensor makes it possible to improve the accuracy of the angular measurement of the rotor without requiring any additional sensor.

The present invention relates also to a wiper system, in particular for a motor vehicle comprising a gear motor as described previously.

The present invention relates also to a method for controlling an electric motor of a gear motor, in particular for wiper systems, the gear motor comprising:

a brushless direct current electric motor comprising:
a rotor,
a stator having electromagnetic excitation coils for the rotor,
a speed-reducing mechanism linked on one side to the rotor of the electric motor and on the other side to an output shaft intended to be linked to an external mechanism, in particular a wiper system, the speed-reducing mechanism having a predefined reduction ratio and,
an output angular position sensor configured to measure the angular position of the output shaft, said method comprising the following steps: for rotation speeds of the rotor below a predetermined threshold:
the angular position of the rotor is determined on the basis of the angular position sensor of the output shaft by taking into account the reduction ratio of the speed-reducing mechanism,
for rotation speeds of the rotor equal to or to above the predetermined threshold,
the angular position of the rotor is determined on the basis of the back-electromotive force signals from the electromagnetic excitation coils of the stator,
control signals are generated to power the electromagnetic excitation coils of the stator as a function of the angular position of the rotor determined in the preceding steps.

According to another aspect of the present, invention, the measurement of the output angular position sensor is corrected on the basis of the back-electromotive force signals.

According to another aspect of the present invention, the electric motor also comprises one or two Hall effect sensors associated with a control magnet secured in rotation to the rotor, wherein the angular measurement from the output angular position sensor is corrected on the basis of the signal from the Hall effect sensor or sensors.

The present invention relates also to a method for controlling an electric motor of a gear motor, in particular for wiper systems, the gear motor comprising:
a brushless direct current electric motor comprising:
a rotor,
a stator having electromagnetic excitation coils for the rotor,
a speed-reducing mechanism linked on one side to the rotor of the electric motor and on the other side to an output shaft intended to be linked to an external mechanism, in particular a wiper system, the speed-reducing mechanism having a predefined reduction ratio and,
an output angular position sensor configured to measure the angular position of the output shaft,
one or two Hall effect sensors associated with a control magnet secured in rotation to the rotor, said method comprising the following steps:
(a) for rotation speeds of the rotor below a predetermined threshold:
the angular position of the rotor is determined on the basis of the angular position sensor of the output shaft by taking into account the reduction ratio of the speed-reducing mechanism and the angular measurement from the output angular position sensor is corrected on the basis of the signal from the Hall effect sensor or sensors,
(b) for rotation speeds of the rotor equal or above the predetermined threshold,
the angular position of the rotor is determined on the basis of the back-electromotive force signals from the electromagnetic excitation coils of the stator,
control signals are generated to power the electromagnetic excitation coils of the stator as a function of the angular position of the rotor determined in the preceding steps.

According to a supplementary aspect of the present invention, the angular measurement from the output angular position sensor and from the Hall effect sensor or sensors is corrected on the basis of the back-electromotive force signals.

Other features and advantages of the invention will emerge from the following description, given as an example and in a nonlimiting manner, in light of the attached drawings in which.

The following embodiments are examples. Although the description refers to one or more embodiments, this does not necessarily mean that each reference relates to the same embodiment or that the features apply only to a single embodiment. Single features of different embodiments can also be combined or interchanged to provide other embodiments.

Figure 2:
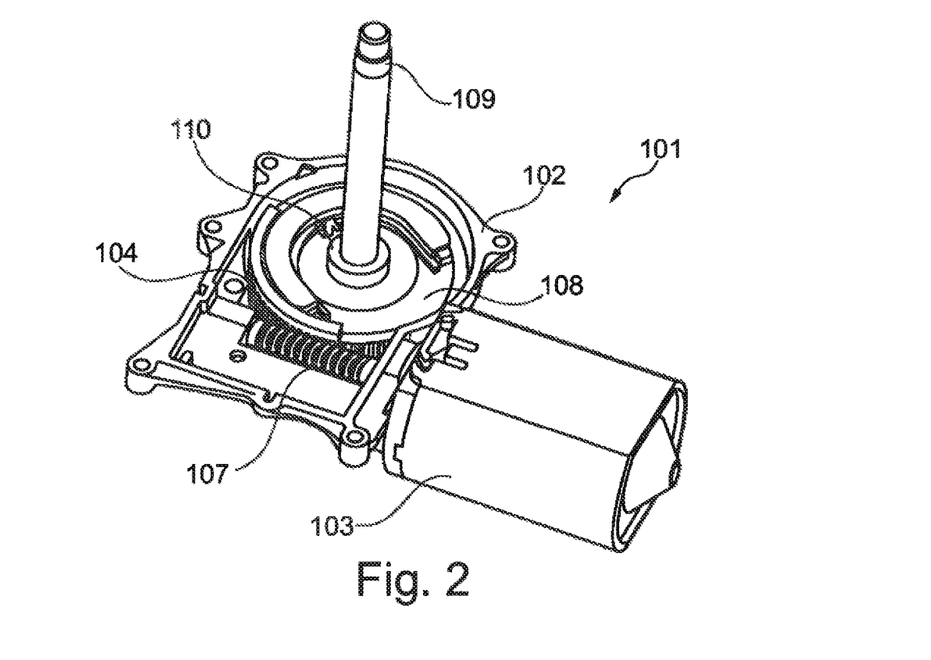
FIG. 2 represents a diagram of a gear motor.

FIG. 2 represents an example of a gear motor 101 intended for a motor vehicle wiper system The gear motor 101 comprises a casing 102 on which are mounted an electric motor 103 coupled to a speed-reducing mechanism 104 having a predefined reduction ratio, for example typically a ratio of 1/69.

The speed-reducing mechanism 104 comprises a worm screw 107 driven in rotation by the electric motor 103 and a tooth wheel 108 secured to an output shaft 109 mounted to be rotationally mobile on an axis substantially at right angles to the axis of rotation of the worm screw 107.

The speed-reducing mechanism 104 is arranged so that the worm screw 107 cooperates by meshing with the tooth wheel 108, such that the output shaft 109 is able to be driven indirectly in rotation by the electric motor 103.

The output shaft 109 is generally linked either directly or via a control gear to a wiper arm on which is fixed a windscreen wiper.

In order to control the wiper system and in particular the speed of the windscreen wiper, an output angular position sensor 110 (schematically represented in FIG. 2) is arranged at, the level of the output shaft 109. The output angular position sensor 110 is for example an analog angular sensor which makes it possible to know the angular position of the output shaft 109 with an accuracy of 0.1°.

In the context of the present invention, the electric motor 103 is a brushless direct current electric motor.

Figure 3A:
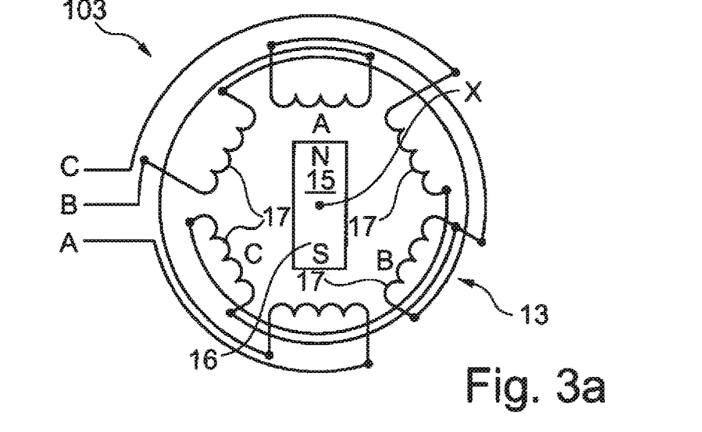
FIGS. 3a, 3b and 3c represent functional diagrams of an electric motor.

As represented in FIG. 3a which represents a schematic view in transverse cross section, the electric motor 103 comprises a stator 13 of cylindrical form at the center of which there is housed a rotor 15.

The rotor 15 is mounted to be rotationally mobile about the central axis X of the electric motor 103 and comprises a permanent magnet 16 whose magnetic poles are represented by the letters N for the North Pole and S for the South Pole. However, the present invention is not limited to a permanent magnet 16 of the rotor 15 comprising two poles, but extends equally to a permanent magnet comprising a higher number of magnetic poles.

The stator 13 comprises electromagnetic excitation coils 17 for the rotor 15 arranged around the rotor 15. The electromagnetic excitation coils 17 are evenly distributed over the circumference of the stator 13. The electric motor 103 is, here, a three-phase motor whose phases are denoted A, B and C. There are six electromagnetic excitation coils 17 (two coils being associated to form a phase) and they are linked according to a star or Y configuration.

Obviously, a different number of electromagnetic excitation coils 17 and a different configuration, for example a delta configuration, can also be used.

Figure 3B:
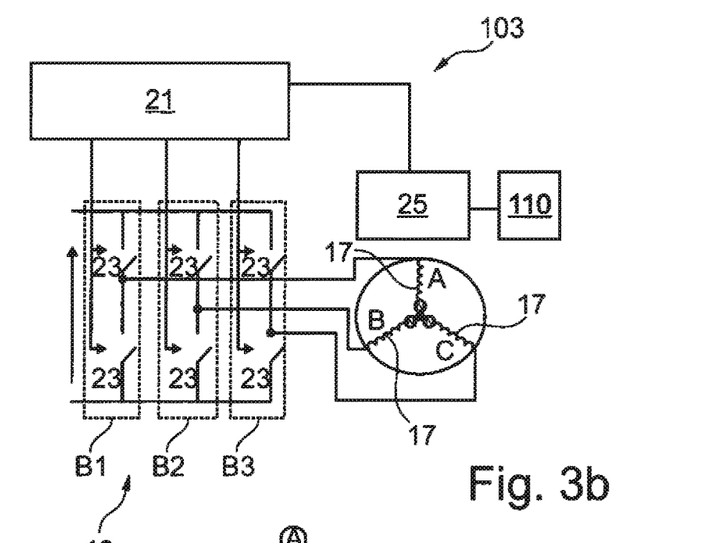

As represented in FIG. 3b, the electromagnetic excitation coils 17 are powered by an inverter 19 managed by a control unit 21.

The inverter 19 comprises three branches denoted B1, B2 and B3 intended to power the respective phases A, B and C of the stator 13, Each branch B1, B2 or B3 comprises two switches 23, the switching of which causes the powering or the non-powering of the electromagnetic excitation coils 17 of the associated phase A, B or C.

Figure 3C:
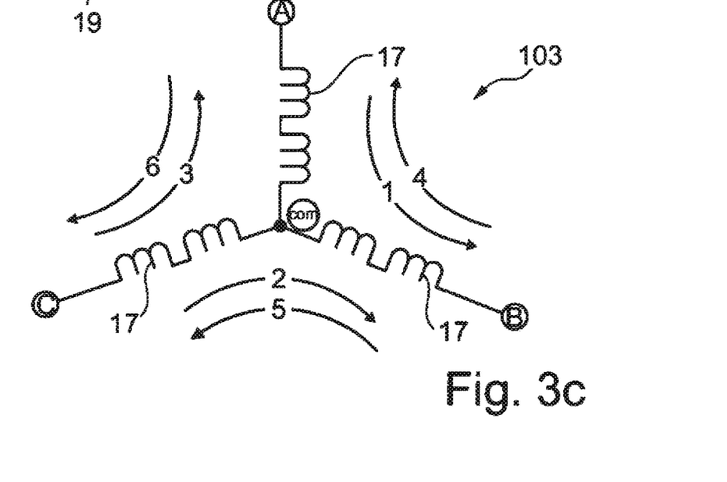

The switches 23 of the inverter 19 are driven by the control unit 21 to obtain a sequence of six switching steps represented by arrows numbered 1 to 6 in FIG. 3c.

The first step 1 corresponds to the switching of the current from the phase to the phase B, the second, step 2 corresponds to the switching of the current from the phase C to the phase B, the third step 3 corresponds to the switching of the current from the phase C to the phase A, the fourth step 4 corresponds to the switching of the current from the phase B to the phase A, the fifth step 5 corresponds to the switching of the current from the phase B to the phase C and the sixth step 6 corresponds to the switching of the current from the phase A to the phase C.

The six switching steps correspond to an electrical 360° rotation, that is to say a full 360° rotation of the rotor in the case where the permanent magnet comprises a single pair of poles. In the case of a magnet comprising two pairs of poles, the six switching steps, corresponding to electrical 360°, correspond to a rotation of 180° of the rotor and, in the case of a magnet comprising three pairs of poles, the six switching steps, corresponding to electrical 360°, correspond to a rotation of 120° of the rotor. The transition from one switching to another is therefore performed on each rotation by a 60° electrical angle of the rotor.

On each step, the current passes through two phases while the third has a floating potential. The sequence of the six switching steps makes it possible to create a revolving magnetic field on the stator 13 which makes it possible to drive the rotor 15 in rotation.

Although this six-step switching scheme is the best known with a conduction of the phases of 120° and a non-excitation of 60°, the present invention is not limited to this single switching scheme but extends also to other types of switching, for example with a conduction of the phases of 180° or intermediate angles or different excitation mixes during the conduction possibly ranging up to a sinusoidal progression.

The electric motor 103 also comprises a device for determining the angular position of the rotor 25 (see FIG. 3b) connected to the control unit 21 to allow the control unit 21 to determine the different switching instants and consequently control the switches 23 of the inverter 19.

The device for determining the angular position of the rotor 25 is connected to the output angular position sensor 110 of the output shaft 109 and is configured to determine the position of the rotor 15 relative to the stator 13 from the angular position of the output shaft 109 supplied by the angular position sensor 110 and the reduction ratio of the speed-reducing mechanism 104.

Thus, the measurement supplied by the output angular position sensor 110 of the output shaft 109 is used by the device for determining the angular position of the rotor 25 to determine the position of the rotor 15.

The angular position of the rotor 15 thus determined is then transmitted by the device for determining the angular position of the rotor 25 to the control unit 21 to make it possible to determine the switching instants of the inverter 19.

A) First Embodiment: Output Angular Position Sensor 110 of the Output Shaft 109 Alone Referring to FIGS. 2 and 3b, according to a first embodiment, only the output angular position sensor 110 of the output shaft 109 is used by the device 25 for determining the angular position of the rotor 15, in particular to determine the position of the rotor 15 for low rotation speeds, that is to say below a predetermined threshold, for example for speeds lower than 10% of the maximum speed of the motor. Here, this concerns the starting phase of the brushless direct current electric motor 3.

For the rotation speeds equal to or above the predetermined threshold, that is to say after the starting phase, the device 25 for determining the angular position of the rotor 15 can determine the angular position of the rotor 15 from the back-electromotive forces measured in the electromagnetic excitation coils 17.

The back-electromotive force is measured in a non-powered coil. For example, in the case of the step 1 of FIG. 3c, the current is transmitted from the phase A to the phase B such that the back-electromotive force is measured in the electromagnetic excitation coil 17 associated with the phase C. The measurement of the back-electromotive force is then transmitted to the device 25 for determining the angular position of the rotor 15.

The device 25 for determining the angular position of the rotor 15 then compares the measured value of the back-electromotive force to a predetermined threshold associated with a predetermined position of the rotor 15. For example, in the case of a symmetrical power supply, the switching instant corresponds to the zero crossing (transition from a positive level to a negative level or the reverse) of the voltage value of the back-electromotive force at the terminals of the non-powered electromagnetic excitation coil 17.

Furthermore, the measured back-electromotive forces are used to correct, even calibrate, the output angular position sensor 110, that is to say to adapt, if necessary, the value of the angle supplied by the output angular position sensor 110 in case of drift thereof.

The accuracy provided by the angular position sensor 110 of the output shaft 109 is thus enhanced and can thus be sufficient to determine the angular position of the rotor 15 for low rotation speeds such that the electric motor 103 requires no sensor dedicated to the angular measurement of the rotor 15.

According to a variant, it is possible to continue to exploit the position of the rotor 15 determined on the basis of the measurement signals delivered by the output angular position sensor 110 even for rotation speeds equal to or above the predetermined threshold.

Figure 4:
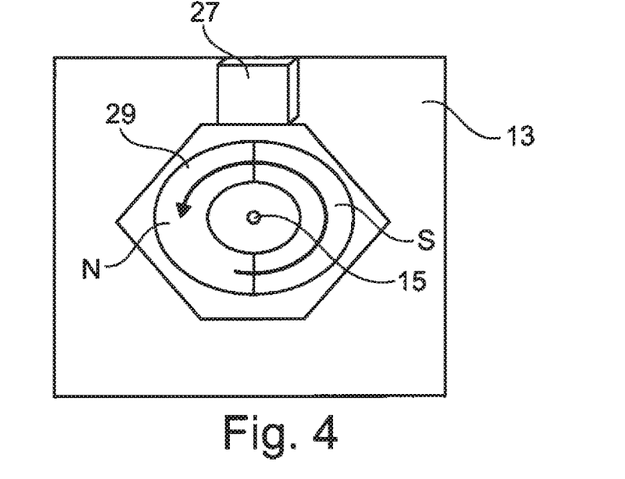
FIG. 4 represents a diagram of a Hall effect sensor associated with a control magnet according to a first embodiment.

B) Second Embodiment: Output Angular Position Sensor 110 of the Output Shaft 109 Combined with a Single Hall Effect Sensor 27 According to a First Configuration According to a second embodiment, the electric motor 103 also comprises a single Hall effect sensor 27 arranged on the stator 13 and associated with a control magnet 29 secured in rotation to the rotor 15 as represented in FIG. 4.

The control magnet 29 comprises the same number of magnetic poles as the rotor 15, that is to say two in the present case, a magnetic North Pole denoted N and a magnetic South Pole denoted S. Furthermore, the magnetic poles of the control magnet 29 are synchronized with the magnetic poles of the rotor 15 such that the signal from the Hall effect sensor 27 corresponds to one of the changes of switching of the electromagnetic excitation coils 17.

The device 25 for determining the angular position of the rotor 15 is connected to the Hall effect sensor 27. The signal received from the Hall effect sensor 27 allows the device 25 for determining the angular position of the rotor 15 to accurately detect the position of the rotor 15 every 180°.

The device 25 for determining the angular position of the rotor 15 can therefore combine the signals from the output angular position sensor 110 and those from the Hall effect sensor 27 to determine the angular position of the rotor 15.

In this case, the signal from the Hall effect sensor 27 is in particular used to correct, even calibrate, the angular measurement from the output angular position sensor 110, but in case of drift thereof.

Figure 5:
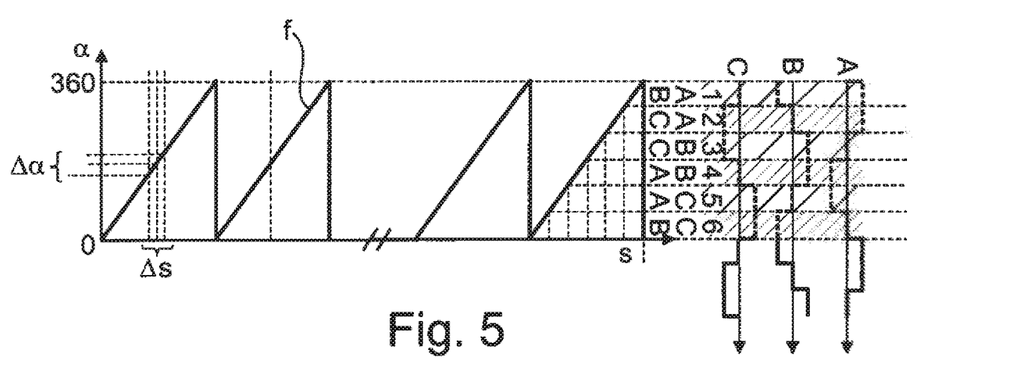
FIGS. 5 represents a graph of the angular position of the rotor relative to a signal supplied by an angular position sensor of an output shaft of the gear motor as well as the control signals of the electromagnetic excitation coils.

FIG. 5 is a graph of a curve f representing the angular position α of the rotor 15 as a function of the signal of the output signal s from the output angular position sensor 110.

The curve f has a generally sawtooth form and varies between a minimum value of 0° and a maximum value of 360°. FIG. 5 also represents, in its righthand part, and according to a rotation of 90° in the clockwise direction, the six steps of switching of the phases A, B and C as a function of the position of the rotor 15. It should be noted that the order of the steps is reversed compared to the cycle of FIG. 3c, the order of the steps depending on the direction of rotation desired for the rotor 15.

Thus, a measurement error Δs on the output signal s from the output angular position sensor 110 produces an error Δα on the estimation of the angular position of the rotor 15 and therefore on the associated switching instants (corresponding to multiples of 60°.

The use of the Hall effect sensor 27 makes it possible to obtain a reference signal for certain predetermined angles, here the angles 0° (or 360° and 180°, which makes it possible to correct the angular position of the rotor 15 obtained from the output angular position sensor 110. The Hall effect sensor 27 thus makes it possible to correct or calibrate the angular position sensor 110 of the output shaft 109.

Figure 6:
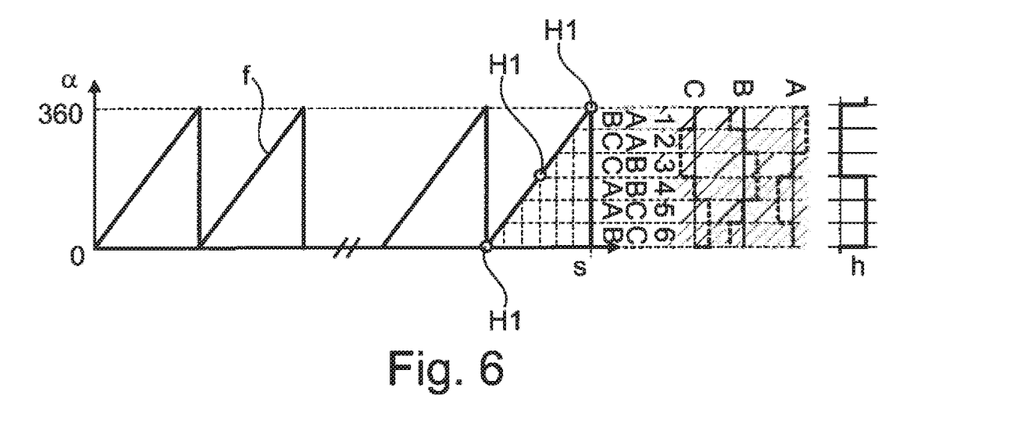
FIG. 6 represents a graph of the angular position of the rotor relative to a signal supplied by an angular position sensor of an output shaft of the gear motor as well as the control signals of the electromagnetic excitation coils and a signal supplied by a Hall effect sensor.

FIG. 6 repeats the graph of FIG. 5 on which is represented, in the righthand part, the signal h from the Hall effect sensor 27. The changes of state of the Hall effect sensor 27 are reported in a portion of the curve f of the signal s from the angular position sensor 110 of the output shaft 109. These changes of state correspond to the 0, 180 and 360° angles, corresponding to changes of switching of the electromagnetic excitation coils 17 and are represented on the signal s by the points H1.

Thus, the Hall effect sensor 27 makes it possible to correct the angular position of the rotor 15 for these angles.

Furthermore, as for the first embodiment, for rotation speeds above a predetermined threshold, the back-electromotive forces measured on the electromagnetic excitation coils 17 can be used by the device 25 for determining the angular position of the rotor 15 to determine the position thereof. The measured back-electromotive forces can also be used to correct the signal obtained from the angular position sensor 110 and from the Hall effect sensor 27 or to correct or calibrate the output angular position sensor 110 and/or the Hall effect sensor 27.

The position of the rotor 15 determined by the device 25 for determining the angular position of the rotor 15 is transmitted to the control unit 21. The control unit is configured to control the power supply of the electromagnetic excitation coils 17 via the inverter 19 on the basis of the determined position of the rotor 15.

In practice, the device 25 for determining the angular position of the rotor 15 and the control unit 21 can, be combined in a single unit, for example a microprocessor, a microcontroller, an ASIC (application-specific integrated circuit) or any other suitable processing means known to the person skilled in the art.

Thus, the use of a single Hall effect sensor 27 makes it possible to obtain a signal in which the change of state corresponds to precise and predetermined positions of the rotor 15, these predetermined positions being configured to correspond with some of the angles for which switchings have to be performed on the power supply of the electromagnetic excitation coils 17.

Furthermore, the signal h from the Hall effect sensor makes it possible to correct the value of the position of the rotor 15 estimated on the basis of the signal a from the output angular position sensor 110 of the output shaft 109.

Alternatively, the Hall effect sensor 27 could be used only to calibrate the output angular position sensor 110 (in this case, the magnetic poles of the control magnet 29 do not need to be synchronized with the magnetic poles of the rotor 15, but it would only be necessary to know the angles corresponding to a change of state of the Hall effect sensor 27).

The measured back-electromotive forces can also be used to determine the position of the rotor 15 and to correct and/or to calibrate the output angular position sensor 110 and/or the Hall effect sensor 27.

Furthermore, it should be noted that the example represented for the different embodiments corresponds to a motor with two poles and a unitary reduction ratio but the present invention is not limited to such an example but extends to other configurations having a different number of poles and a different reduction ratio.

Figure 7:
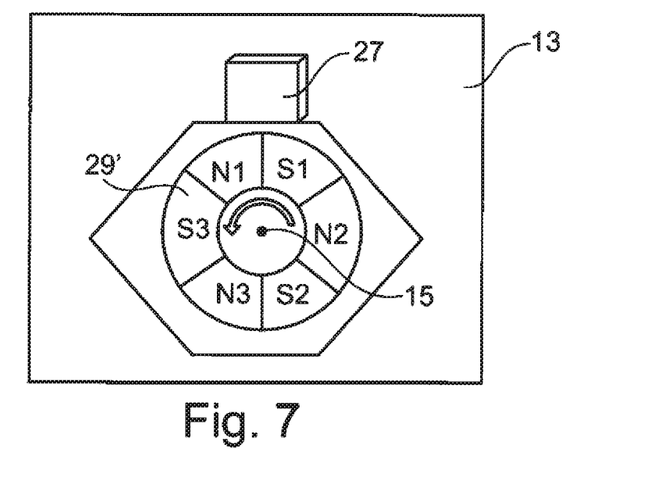
FIG. 7 represents a Hall effect sensor associated with a control magnet according to a second embodiment.

C) Third Embodiment: Output Angular Position Sensor 110 of the Output Shaft 109 Combined with a Single Hall Effect Sensor 27 According to a Second Configuration According to a third embodiment illustrated in FIGS. 7 and 8, the electric motor 103 comprises a single Hall effect sensor 27 as for the second embodiment, but the associated control magnet 29' has a number of magnetic poles equal for example to three times the number of magnetic poles of the rotor 15. In the present case, the number of poles of the control magnet 29' therefore comprises six magnetic poles denoted N1, N2 and N3 for the North Poles and S1, S2 and S3 for the South Poles as represented in FIG. 7. Each magnetic pole of the control magnet 29 occupies an angular segment of 60°.

The electric motor 3 is, moreover, similar to the second embodiment and only the differences in operation will now be described.

By virtue of the six magnetic poles of the control magnet 29', the Hall effect sensor 27 can detect a precise angular position of the rotor every 60°. The electric motor 103 is therefore configured such that the changes of state of the signal supplied by the Hall effect sensor 27 correspond to the changes of switching of the inverter 19 as represented in the graph of FIG. 8.

Figure 8:
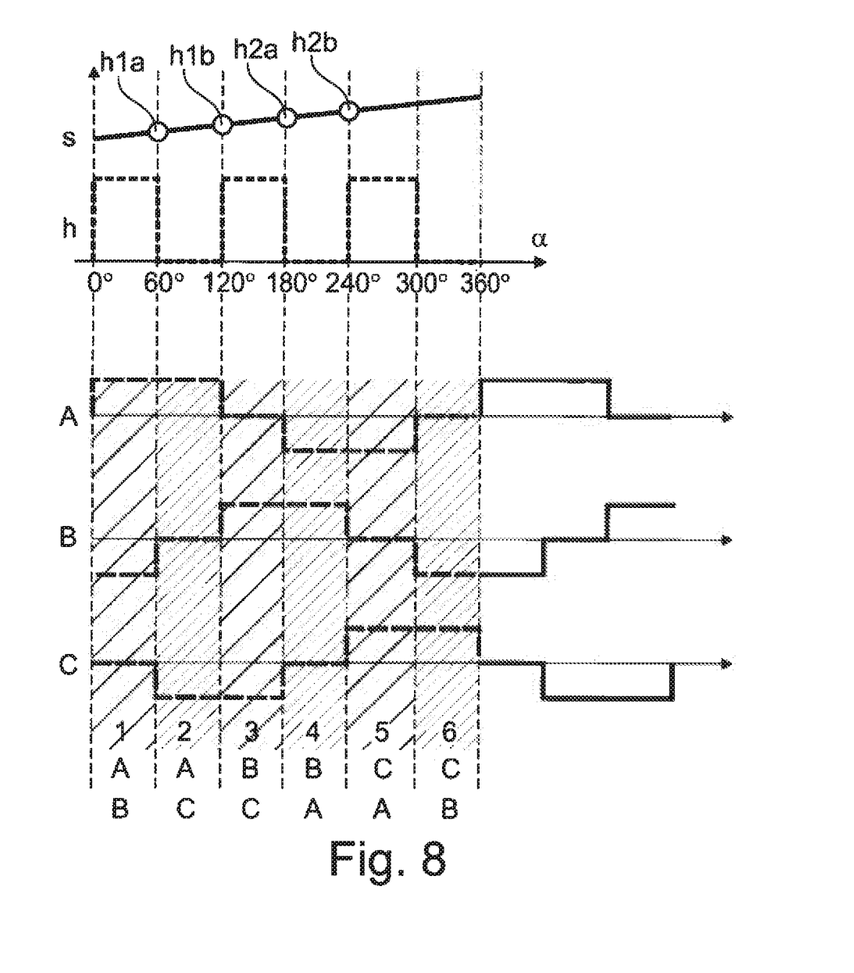
FIG. 8 represents a graph of the signals supplied by the Hall effect sensor of FIG. 7 and an angular position sensor of an output shaft of the gear motor as well as the control signals of the electromagnetic excitation coils.

In effect, FIG. 8 represents, in its top part, the signal h from the Hall effect sensor 27 as a function of the angular position of the rotor 15 and the position s of the rotor 15 calculated on the basis of the signal from the output angular position sensor 110.

Four successive changes of state of the Hall effect sensor 27 are reported on the signal s from the output angular position sensor 110 and represented by the points h1*a*, h1*b*, h2*a* and h2*b* which are therefore spaced apart from 60° (60°, 120°, 180° and 240° positions), The six steps corresponding to the switching cycle of the electromagnetic excitation coils 17 are also represented in the bottom part of FIG. 8.

The changes of state of the signal from the Hall effect sensor 27 therefore make it possible, on the one hand, to determine the instants at which the changes of switching of the inverter 19 must be applied and, on the other hand, to calibrate or to correct the angular position determined using the output angular position sensor 110.

This embodiment makes it possible to control the electric motor 3 when the estimation of the position of the rotor 15 determined on the basis of a measurement of the angular position sensor 110 of the output shaft 109 has an error ranging up to +/− 60°. In effect, the changes of state (from the low level to the high level (at 120 and 240°) or from the high level to the low level (at 60° and)180° occur every 120° (which means that an error less than ±120° of the angular position sensor 110 makes it possible to differentiate two changes of state). However, upon a startup, it is necessary to know the position before the change of state of the signal h (in the case of FIG. 8, if at the low level, it is necessary to know if the position is between the points h1*a* and h1*b*, that is to say between 60 and 120°, or if the position is between the points h2*a* and h2*b* that is to say between 180 and) 240°, so it is necessary for the output sensor to have an error less than ±60° to be able to perform this determination.

Alternatively, the Hall effect sensor 27 could be used only to calibrate the output angular position sensor 110 (in this case, the magnetic poles of the control magnet 29' do not need to be synchronized with the magnetic poles of the rotor 15, but it would only be necessary to know the angles corresponding to a change of state of the Hall effect sensor 27).

The measured back-electromotive forces can also be used to determine the position of the rotor 15 and to correct and/or to calibrate the output angular position sensor 110 and/or the Hall effect sensor 27.

D) Fourth Embodiment: Output Angular Position Sensor 110 of the Output Shaft 109 Combined with Two Hall Effect Sensors 27*a* and 27*b* According to a First Configuration According to a fourth embodiment illustrated in FIGS. 9 and 10 the electric motor 103 comprises two Hall effect sensors 27*a* and 27*b* associated with a control magnet 29 of which the number of magnetic poles is equal to three times the number of magnetic poles of the rotor 15 and similar to the control magnet 29' of the third embodiment.

Figure 9:
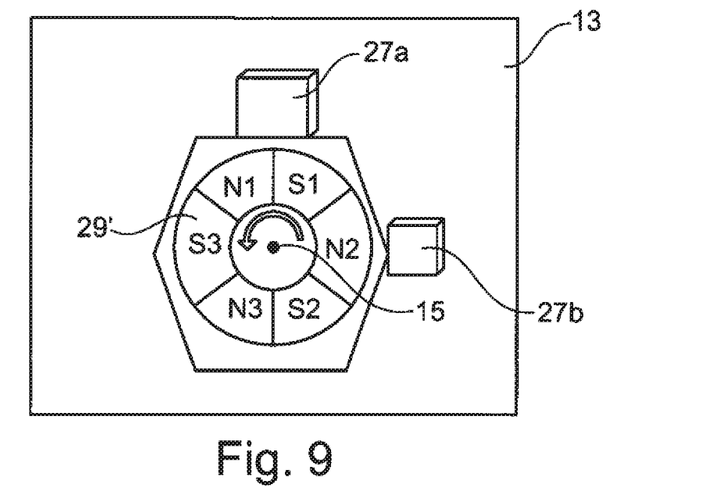
FIG. 9 represents two Hall effect sensors associated with a control magnet according to a third embodiment.

In the present case, the number of poles of the control magnet 29 therefore comprises six magnetic poles as represented in FIG. 9. The two Hall effect sensors 27*a* and 27*b* are, for example, arranged around the rotor and offset by an angular position such that the signals from the two Hall effect sensors 27*a* and 27h are offset by a quarter period, in our case the Hall effect sensors 27*a* and 27*b* can be offset by 30°, 90° or 150°. Obviously, other angles (differing by a multiple of 60°) can also be used without departing from the scope of the present invention.

The electric motor 103 is, moreover, similar to the second embodiment and only the differences in operation will now be described.

Figure 10:
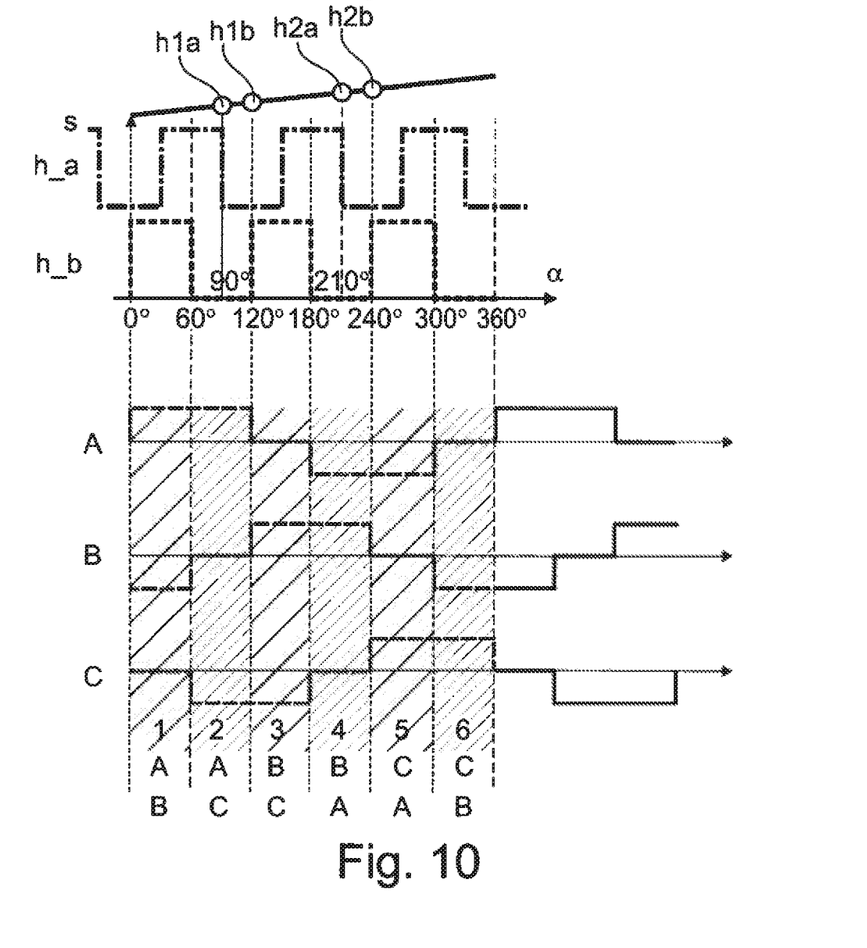
FIG. 10 represents a graph of the signals supplied by the Hall effect sensors of FIG. 9 and an angular position sensor of an output shaft of the gear motor as well as the control signals of the electromagnetic excitation coils.

The electric motor 103 is configured such that the changes of state of the signal supplied by one of the two Hall effect sensors 27*a* or 27*b*, for example the sensor 27*b*, correspond to the changes of switching of the inverter 19 as represented in the graph of FIG. 10.

Two changes of state of each of the Hall effect sensor 27*b* are reported on the signal s from the angular position sensor 110 of the output shaft 109 and represented by the points h1*a*, h1*b*, h2*a* and h2*b* which are positioned at 60°, 120°, 180° and 240°). The two Hall effect sensors 27*a* and 27*b* arranged at 90° therefore make it possible to obtain a detection of the position of the rotor 15 every 30°. There are four possible states: both signals at the low level, both signals at the high level, the signal h_a at the low level and the signal h_b at the high level and finally the signal h_a at the high level and the signal h_b at the low level. Because of the offset of 30° between the two signals, there is a deviation of 90° between two successive identical states.

The six steps corresponding to the switching cycle of the electromagnetic excitation coils 17 are also represented in the bottom part of FIG. 10.

Thus, one of the Hall effect sensors, for example the sensor 27*b*, makes it possible to provide the instants of changes of switching of the inverter 19 as in the third embodiment and the other Hall effect sensor, for example the sensor 27a, makes it possible to obtain the direction of rotation of the rotor 15.

Furthermore, it is possible to increase the accuracy with which the position of the rotor 15 is determined. In effect, as for the third embodiment, the signals from the Hall effect sensors 27a and 27b can be used to correct and/or calibrate the output angular position sensor 110.

The measured back-electromotive forces can also be used to determine the position of the rotor 15 and to correct and/or to calibrate the output angular position sensor 110 and/or the Hall effect sensors 27a and 27b.

This embodiment makes it possible to control the electric motor 103 when the estimation of the position of the rotor 15 determined on the basis of a measurement from the angular position sensor 110 of the output shaft 109 reaches an error ranging up to +/− 90°.

In effect, two identical chances of state (transition from a high level to a low level or transition from a low level to a high level) of a Hall effect sensor 27a or 27b occur every 120° for example between the points h1a and h2a or the points h1b and h2b (which means that an error less than ±120° of the angular position sensor 110 makes it possible to differentiate two changes of state).

However, upon a startup, it is necessary to know the position before the change of state (in the case of FIG. 10, if at the low level for the two signals h_a and h_b, it is necessary to know if the location is between the points h1a and h1 b that is to say between 90° and 120° or if the location is between the points h2a and h2b, that is to say between 210° and 240°), so it is therefore necessary for the output sensor to have an error less than ±90° to be able to perform this determination Alternatively, the Hall effect sensors 27a and 27b could be used only to calibrate the output angular position sensor 110 (in this case, the magnetic poles of the control magnet 29' do not need to be synchronized with the magnetic poles of the rotor 15 but it would only be necessary to know the angles corresponding to a change of state of the Hall effect sensors 27a and 27b).

E) Fifth Embodiment: Output Angular Position Sensor 110 of the Output Shaft 109 Combined with Two Hall Effect Sensors 27a and 27b According to a Second Configuration According to a fifth embodiment illustrated in FIGS. 11 and 12, the electric motor 103 comprises two Hall effect sensors 27a and 27b associated with a control magnet 29" comprising four magnetic poles, which corresponds to four times the number of pairs of poles of the motor.

Figure 11:
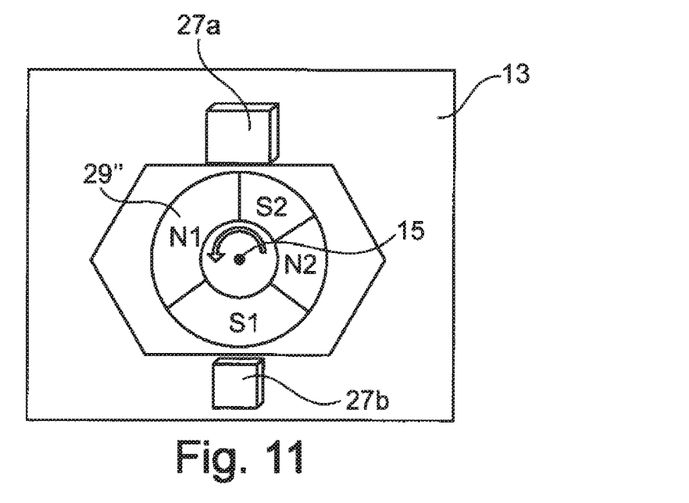
FIG. 11 represents two Hall effect sensors associated with a control magnet according to a fourth embodiment.

Furthermore, the magnetic poles have an asymmetrical angular distribution on the control magnet 29". For example a first North Pole N1 and a first South Pole S1 each spread over an angular segment of 120° whereas a second North Pole N2 and a second South Pole S2 each spread over an angular segment of 60°.

The Hall effect sensors 27a and 27b are for example arranged at 180° from one another about the axis of the rotor 15 (other angles such as 60° can also be used, but it is necessary to have a switching every 60°).

The electric motor 103 is otherwise similar to the second embodiment and only the differences of operation will now be described.

Figure 12:
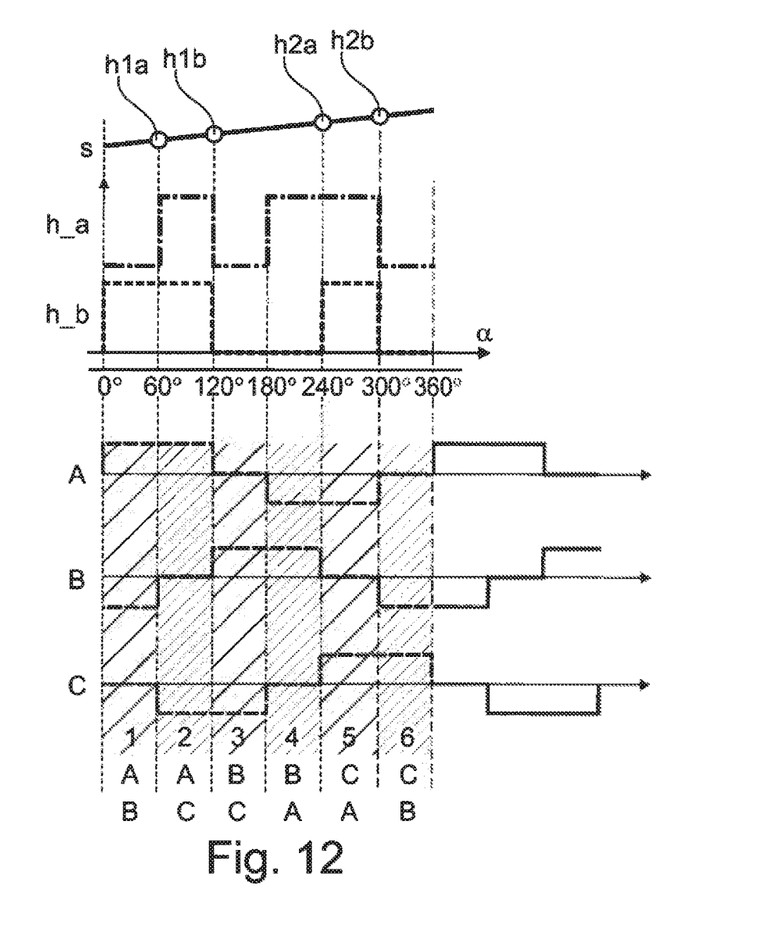
FIG. 12 represents a graph of the signals supplied by the Hall effect sensors of FIG. 11 and an angular position sensor of an output shaft of the gear motor as well as the control signals of the electromagnetic excitation coils.

The electric motor 103 is configured such that the changes of state of the signal supplied by the Hall effect sensors 27a and 27b correspond to the changes of switching of the inverter 19 as represented in the graph of FIG. 12.

Two changes of state of each of the Hall effect sensors 27a and 27b are reported on the signal s from the output angular position sensor 110 of the output shaft 109 and represented by the points h1a, h1b, h2a and h2b which are positioned at 60°, 120°, 240° and 300°). The two Hall effect sensors 27a and 27b arranged at 180° therefore make it possible to obtain a detection of the position of the rotor 15 every 60°.

The six steps corresponding to the switching cycle of the electromagnetic excitation coils 17 are also represented in the bottom part of FIG. 12.

As for the fourth embodiment, the signals from the Hall effect sensors 27a and 27b are used to correct and/or to calibrate the output angular position sensor 110. The measured back-electromotive forces can also be used to determine the position of the rotor 15 and to correct and/or calibrate the output angular position sensor 110 and/or the Hall effect sensors 27a and 27b.

This embodiment makes possible to control the electric motor 103 when the estimation of the position of the rotor 15 determined on the basis of a measurement from the angular position sensor 110 of the output shaft 109 reaches an error ranging up to +/− 120°. In effect, two identical positions of the signals h_a and h_b from the sensors 27a and 27b are separated by 120°. For example, the two signals h_a and h_b are at the high level between the points h1a and h1b, that is to say between 60° and 120°, then between the points h2a and h2b, that is to say between 240° and 300°. Thus, to determine on startup whether the location is between 60° and 120° or between 240° and 300°, it is sufficient to use an angular position sensor 110 for which the error is less than 120°. Such a configuration therefore makes it possible to use an angular position sensor 110 of low accuracy and therefore of low cost.

Alternatively, the Hall effect sensors 27a and 27b could be used only to calibrate the output angular position sensor 110 (in this case, the magnetic poles of the control magnet 29'" do not need to be synchronized with the magnetic poles of the rotor 15, but it would only be necessary to know the angles corresponding to a change of state of the Hall effect sensors 27a and 27b).

Figure 13:
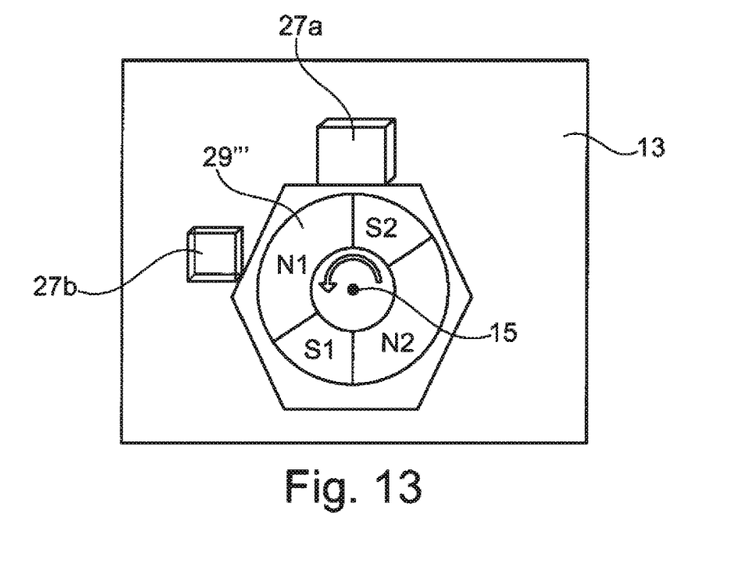
FIG. 13 represents two Hall effect sensors associated with a control magnet according to a fifth embodiment.

F) Sixth Embodiment: Output Angular Position Sensor 110 of the Output Shaft 109 Combined with Two Hall Effect Sensors 27a and 27b According to a Third Configuration According to a sixth embodiment illustrated in FIGS. 13 and 14, the electric motor 103 comprises two Hall effect sensors 27a and 27b associated with a control magnet 29'" comprising four magnetic poles as represented in FIG. 13 which corresponds to four times the number of pairs of poles of the rotor 15.

The magnetic poles of the control magnet 29'" have an alternating distribution, but the North magnetic poles N1 and N2 each spread over an angular segment of 120° whereas the South magnetic poles S1 and S2 spread over an angular segment of 60°.

The Hall effect sensors 27a and 27b are for example arranged at 60° from one another about the axis of the rotor 15 (other angles can also be used).

The electric motor 103 is otherwise similar to the second embodiment and only the differences in operation will now be described.

Figure 14:
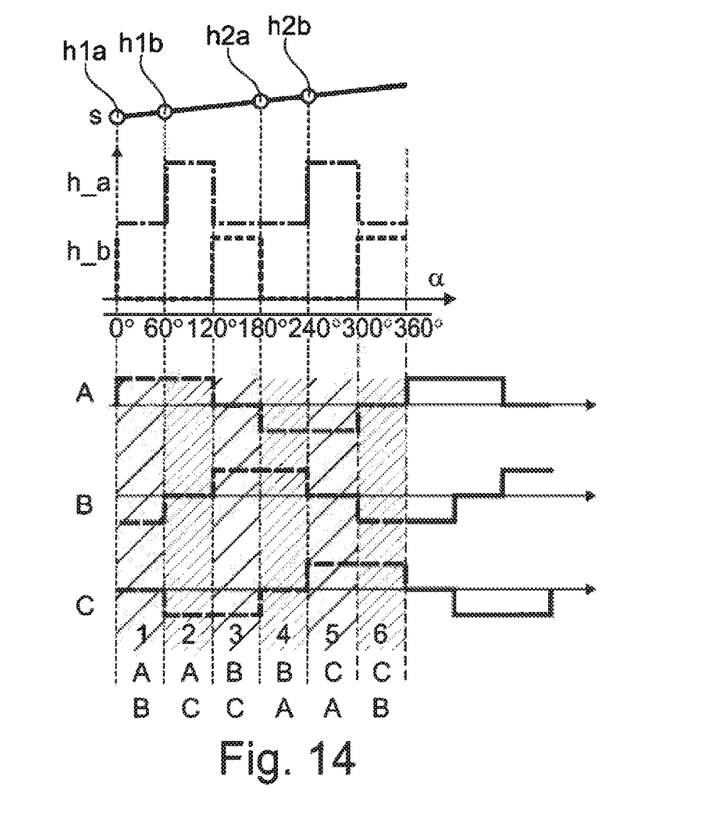
FIG. 14 represents a graph of the signals supplied by the Hall effect sensors of FIG. 13 and an angular position sensor of an output shaft of the gear motor as well as the control signals of the electromagnetic excitation coils In all the figures, the elements that are the same bear the same reference numbers.

The electric motor 103 is configured such that the changes of state of the signal supplied by the Hall effect sensors 27a and 27b correspond to the changes of switching of the inverter 19 as represented in the graph of FIG. 14.

Two changes of state of each of the Hall effect sensors 27a and 27b are reported on the signal s from the angular position sensor 110 of the output shaft 9 and represented by, the points h1a, h1b, h2a and h2b which are positioned at 0°, 60° 180° and 240°. The two Hall effect sensors 27a and 27b arranged at 60° therefore make it possible to obtain a detection of the position of the rotor 15 every 60°. Furthermore, two identical positions of the signals h_a and h_b from the sensors 27*a* and 27*b* are separated by 120° For example, both the signals h_a and h_b are at the low level between the points h1*a* and h1*b*, that is to say between 0° and 60° then between the points h2*a* and h2*b*, that is to say between 180° and 240°. Thus, to determine on startup whether the location is between 0° and 60° or between 180° and 240°, it is sufficient to use an angular position sensor 110 for which the error is less than 120°. Such a configuration therefore also makes it possible to use an angular position sensor 110 of low accuracy and therefore of low cost.

The six steps corresponding to the switching cycle of the electromagnetic excitation coils 17 are also represented in the bottom part of FIG. 14.

As for the fourth embodiment, the signals from the Hall effect sensors 27*a* and 27*b* are used to calibrate the output angular position sensor 110. The measured back-electromotive forces can also be used to determine the position of the rotor 15 and to correct and/or calibrate the output angular position sensor 110 and/or the Hall effect sensors 27*a* and 27*b*.

This embodiment makes it possible to control the electric motor 103 when the estimation of the position of the rotor 15 determined on the basis of a measurement from the angular position sensor 110 of the output shaft 109 reaches an error ranging up to +/− 120°.

Alternatively, the Hall effect sensors 27*a* and 27*b* could be used only to calibrate the output angular position sensor 110 (in this case, the magnetic poles of the control magnet 29''' do not need to be synchronized with the magnetic poles of the rotor 15 but it would only be necessary to know the angles corresponding to a change of state of the Hall effect sensors 27*a* and 27*b*).

Other embodiments comprising one or two Hall effect sensors 27, 27*a*, 27*b* associated with a control magnet 29, 29', 29", 29''' comprising a greater or lesser number of magnetic poles can also be envisaged in the context of the present invention. The Hall effect sensors 27, 27*a*, 27*b* make it possible to determine the switching instants of the inverter 19 and/or to calibrate the output angular position sensor 110 of the output shaft 109.

Thus, the use of the signal supplied by an angular position sensor 110 of the output shaft 109 of a gear motor 101 to estimate the position of the rotor 15 in order to control the power supply of the electromagnetic excitation coils 17 of the electric motor 103 of the gear motor 101 makes it possible to reduce the number of dedicated sensors necessary to the determination of the angular position of the rotor 15 and thus reduce the cost of the electric motor 103. Furthermore, the use of the angular position sensor 110 of the output shaft 109 makes it possible to estimate the position of the rotor 15 for low rotation speeds and can therefore be combined with a sensorless technique based on a measurement of the back-electromotive forces on the electromagnetic excitation coils 17 to provide an inexpensive electric motor 103 that can be used in applications requiring a full-load startup, such as, for example, a gear motor 101 for a motor vehicle wiper device.

Furthermore, depending on the accuracy required in the determination of the position of the rotor 15, different configurations requiring one or two Hall effect sensors 27, 27*a*, 27*b* can be used to obtain a reliable estimation of the position of the rotor 15 by requiring fewer than three Hall effect sensors as is the case in the embodiments of the state of the art.

Also, the electromotive force signals can then be used to correct or calibrate the measurements performed by the angular position sensor 110 of the output shaft 109 and/or the Hall effect sensors 27 27*a* and 27*b* when the latter are used.

The invention claimed is:

1. A gear motor for a wiper system, comprising:
    a brushless direct current electric motor comprising:
        a rotor,
        a stator having electromagnetic excitation coils for the rotor,
        a device for determining an angular position of the rotor relative to the stator,
        a control unit configured to generate control signals for powering the electromagnetic excitation coils of the stator as a function of the angular position of the rotor determined by the device for determining the angular position of the rotor,
        a speed-reducing mechanism linked on one side to the rotor of the electric motor and on another side to an output shaft linked to a wiper system, the speed-reducing mechanism having a predefined reduction ratio, and
        an output angular position sensor configured to measure an angular position of the output shaft,
        at least one Hall effect sensor associated with a control magnet secured in rotation to the rotor,
    wherein the output angular position sensor is connected to the device for determining the angular position of the rotor and is configured to transmit a signal corresponding to a measured angular position of the output shaft,
    wherein said device for determining the angular position of the rotor is configured to:
    (a) for rotation speeds of the rotor below a predetermined threshold:
        determine the angular position of the rotor relative to the stator based on a transmitted signal by taking into account the predefined reduction ratio of the speed-reducing mechanism; and
        correct an angular measurement from the output angular position sensor based on a signal from the Hall effect sensor or sensors,
    (b) for rotation speeds of the rotor equal to or above the predetermined threshold:
        determine the angular position of the rotor relative to the stator based on back- electromotive force signals from the electromagnetic excitation coils of the stator; and
        generate control signals to power the electromagnetic excitation coils of the stator as a function of the angular position of the rotor determined in preceding steps.

2. The gear motor as claimed in claim 1, wherein the device for determining the angular position of the rotor is configured to:
    determine the angular position of the rotor based on a signal from the output angular position sensor for rotation speeds of the rotor below a predetermined threshold, and
    determine the angular position of the rotor based on back-electromotive force signals from the electromagnetic excitation coils of the stator for rotation speeds of the rotor equal to or above the predetermined threshold.

3. The gear motor as claimed in claim 2, wherein the back-electromotive force of a, at least one, non-powered electromagnetic excitation coil is measured and transmitted to the device for determining the angular position of the rotor, said device for determining the angular position of the rotor being configured to compare a value of the back-electromotive force to a predetermined threshold associated with a predetermined position of the rotor.

4. The gear motor as claimed in claim 3, wherein the device for determining an angular position of the rotor is configured to correct an angular measurement from the output angular position sensor from the signals measuring the back-electromotive forces of the electromagnetic excitation coils of the stator.

5. The gear motor as claimed in claim 1, wherein the brushless direct current electric motor comprises a single Hall effect sensor associated with a control magnet secured in rotation to the rotor, said Hall effect sensor being connected to the device for determining the angular position of the rotor and wherein said device for determining the angular position of the rotor is configured to correct the angular measurement from the output angular position sensor based on a signal from the Hall effect sensor.

6. The gear motor as claimed in claim 5, wherein:
the device for determining the angular position of the rotor is configured to detect a change of state of the signal from the Hall effect sensor, said change of state being associated with a predetermined position of the rotor and to correct the angular measurement from the output angular position sensor based on said detection of the change of state.

7. The gear motor as claimed in claim 5, wherein:
the rotor comprises a predetermined number of magnetic poles,
the control magnet comprises a number of magnetic poles equal to or greater than the number of magnetic poles of the rotor, and
the magnetic poles of the control magnet are in phase with magnetic poles of the rotor such that sending of a control signal powering the electromagnetic excitation coils of the stator is synchronized with a detection of a change of state of the signal from the Hall effect sensor.

8. The gear motor as claimed in claim 5, wherein the device for determining the angular position of the rotor is configured to:
determine the angular position of the rotor based on signals from the Hall effect sensor or sensors and the output angular position sensor for rotation speeds of the rotor below a predetermined threshold, and
determine the angular position of the rotor based on back-electromotive force signals from the electromagnetic excitation coils of the stator for rotation speeds of the rotor equal to or above the predetermined threshold,
wherein the device for determining the angular position of the rotor is configured to correct the angular measurement from the Hall effect sensor or sensors or from the output angular position sensor based on signals measuring the back-electromotive forces of the electromagnetic excitation coils of the stator.

9. The gear motor as claimed in claim 1, wherein the electric motor comprises two Hall effect sensors associated with a control magnet secured in rotation to the rotor, said Hall effect sensors being angularly offset relative to one another and connected to the device for determining the angular position of the rotor and wherein said device for determining the angular position of the rotor is configured to correct an angular measurement signal from the output angular position sensor based on signals from the two Hall effect sensors.

10. A wiper system for a motor vehicle comprising the gear motor as claimed in claim 1.

11. A method for controlling an electric motor of a gear motor for wiper systems, the gear motor comprising:
a brushless direct current electric motor comprising:
a rotor,
a stator having electromagnetic excitation coils for the rotor,
a speed-reducing mechanism linked on one side to the rotor of the electric motor and on another side to an output shaft linked to a wiper system, the speed-reducing mechanism having a predefined reduction ratio and,
an output angular position sensor configured to measure an angular position of the output shaft,
at least one Hall effect sensor associated with a control magnet secured in rotation to the rotor,
said method comprising:
(a) for rotation speeds of the rotor below a predetermined threshold:
an angular position of the rotor is determined based on the angular position sensor of the output shaft by taking into account a reduction ratio of the speed-reducing mechanism and an angular measurement from the output angular position sensor is corrected based on a signal from the Hall effect sensor or sensors,
(b) for rotation speeds of the rotor equal to or above the predetermined threshold,
the angular position of the rotor is determined based on back-electromotive force signals from the electromagnetic excitation coils of the stator, and
control signals are generated to power the electromagnetic excitation coils of the stator as a function of the angular position of the rotor determined in preceding steps.

12. The method for controlling an electric motor of the gear motor as claimed in claim 11, wherein the angular measurement from the output angular position sensor and from the Hall effect sensor or sensors is corrected based on back-electromotive force signals.

* * * * *